United States Patent Office 3,081,230
Patented Mar. 12, 1963

3,081,230
DIURETIC AND ANTIHYPERTENSIVE TRIAMINOARYLPTERIDINES
Joseph Weinstock, Phoenixville, and Virgil Daniel Wiebelhaus, Springfield, Pa., assignors to Smith Kline & French Laboratories, Philadelphia, Pa., a corporation of Pennsylvania
No Drawing. Filed Sept. 8, 1960, Ser. No. 54,598
22 Claims. (Cl. 167—65)

This invention relates to novel medicinal compositions having substantial diuretic and hypotensive activities as well as to methods of treating edematous and/or hypertensive patients with these compositions. Furthermore these compositions are characterized by having critical amounts of various 2,4,7-triamino-6-phenylpteridine derivatives contained therein combined with a pharmaceutical carrier.

One of the major drawbacks of the nonmercurial orally effective diuretics is the enhancement of potassium excretion. This excess potassium loss is the cause of fatigue and mental confusion, side effects observed when these diuretics are administered. Still another disadvantage is these nonmercurial orally effective diuretics is that sodium is at times excreted as the bicarbonate salt. The excretion of the sodium salt as sodium bicarbonate depletes the body of base and causes a systemic acidosis.

The novel medicinal preparations of this invention which contain 2,4,7-triamino-6-phenylpteridines have the very unique property of causing the excretion of sodium as the chloride salt. More important, the compositions of this invention not only cause the excretion of sodium as the chloride salt but also cause this excretion with very little potassium loss. It is then evident that the use of the novel medicinal preparations of this invention overcome the side effects caused by the excess excretion of potassium and liberation of sodium as the bicarbonate which are associated with other nonmercurial orally effective diuretics. Furthermore, the medicinal preparations of this invention have a novel value when used in combination with other diuretics. These preparations potentiate the action of other diuretics and restrict the loss of potassium due to their action. Still another novel use for these medicinal preparations is in the hypertensive area. The novel preparations of this invention bring about a lowering in blood pressure and are useful as antihypertensive agents. The diuretic activity is however preferred.

The novel compositions and methods of using them described hereafter have been found unexpectedly to possess the practical actions noted above through their unexpectedly high activity in acting as blockers of the hormone, aldosterone. The previously known organic chemicals which have the much desired "antialdosterone" activity are generally steroids of complex structure and thereby necessarily very expensive and difficult to prepare. The active ingredients in these compositions and methods described herein are readily prepared, much more active than previously known compounds and have activity in certain abnormal conditions not effected by the thiazide type of prior art diuretic. The compositions and methods described herein are therefore particularly effective in patients with abnormal aldosterone balance.

Additionally the active ingredient pteridines of these compositions are rapidly absorbed from the gastrointestinal tract after oral administration with remarkably low toxicity within the dose ranges described. This is particularly true with the preferred 6-(unsubstituted phenyl)-2,4,7-triaminopteridine derivative.

The active ingredient pteridines have been found to possess varying proportions of diuretic and hypotensive activities. For instance the unsubstituted 6-phenylpteridine derivatives have exceptionally high diuretic and hypotensive activity. Some of the 6-(substituted phenyl)-pteridines have less diuretic and more hypotensive activity.

More specifically, the compositions of this invention are in dosage units and comprised of a nontoxic pharmaceutical carrier and a compound represented by the following formula:

Formula I

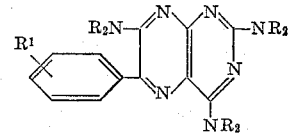

in which R represents hydrogen or lower alkyl having not in excess of 3 carbon atoms, preferably methyl and $R^1$ represents hydrogen, a lower alkyl group having not in excess of 3 carbon atoms, preferably methyl, a lower alkoxyl group having not in excess of 3 carbon atoms, preferably methoxy, halo, preferably chloro, bromo or fluoro, or trifluoromethyl.

Advantageously the pteridine ingredients are those represented by Formula I in which R is hydrogen and $R^1$ is hydrogen, a lower alkyl group having not in excess of 3 carbon atoms, preferably methyl, a lower alkyloxyl group having not in excess of 3 carbon atoms, preferably methoxy, or halogen.

Most advantageously the compositions of this invention in dosage unit form comprise a nontoxic pharmaceutical carrier combined with 2,4,7-triamino-6-phenylpteridine.

The 2,4,7-triamino-6-phenylpteridine derivatives present in these novel compositions are prepared by condensing 5-nitroso-2,4,6-triaminopyrimidine and the appropriate phenylacetonitrile. This is accomplished by heating these compounds in suitable solvents, such as for example, 2-ethoxyethanol, butanol, formamide and dimethylformamide in the presence of an anhydrous sodium compound such as sodium ethoxide or sodium methoxide. Preferably the condensation is accomplished in the presence of dimethylformamide and anhydrous sodium methoxide. The desired pteridine is precipitated and the product is recrystallized.

Advantageously the triaminopteridines as represented by the above formulae will be administered in a preparation comprising a pharmaceutical carrier and will be present in an amount to produce diuresis and/or blood pressure lowering (hypotension) in the animal organism. Preferably the preparation will contain the active medicament in an amount of from about 5 mg. to about 250 mg., advantageously from about 10 mg. to about 100 mg., per dosage unit.

The pharmaceutical carrier may be, for example, either a solid or a liquid. Exemplary of solid carriers are lactose, magnesium stearate, terra alba, sucrose, talc, stearic acid, gelatin, agar, pectin or acacia. Exemplary of liquid carriers are peanut oil, olive oil, sesame oil and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tableted, placed in a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule or a liquid suspension.

The method in accordance with this invention comprises administering internally to an animal organism a compound as represented by the above formulae usually combined with a nontoxic pharmaceutical carrier as described in an amount sufficient to produce antialdosterone activity manifested by diuretic and/or hypotensive action. The active medicament preferably will be in an amount of from about 5 mg. to about 250 mg., advantageously from about 10 mg. to about 100 mg. The administration may be parenterally or orally, the latter being the preferable route of administration. Advantageously, equal doses, or dosage units, will be administered from one to four times daily. The total daily dosage will be from about 5 mg. to about 1000 mg., preferably from about 5 mg. to about 600 mg. and advantageously from about 10 mg. to about 400 mg. of active medicament. In the range of the daily dosage regimen of from about 600–1000 mg. the patients being treated must be watched carefully since some non-limiting side effects may occur along with the desired pharmacodynamic activity. In the preferred regimens toxicity is low. When the administration described above is carried out diuretic and/or hypotensive action resulting from antialdosterone activity is produced rapidly and effectively. This method of inducing diuresis and/or hypotension is particularly effective when applied to humans with an abnormal liquid and electrolyte balance in the body, that is human beings in an edematous condition and/or with abnormally high blood pressure. Of course edema and high blood pressure are abnormal conditions of the body which often occur concurrently.

The dose ranges of the pharmaceutical compositions and methods noted above have been found to be quite critical. At dosages above those noted some toxic manifestations such as decreased cardiac output may be found as well as increased filtration rate in the kidney. For instance a dose of 300 mg. once a day was found to decrease the glomerular filtration rate in an edematous patient briefly but upon continuation was found to be diuretic. Doses lower than those mentioned above give a less satisfactory level of pharmacodynamic activity. In summary, the specific dose ranges mentioned have been found to be highly useful. No particular advantage is realized in going outside of the ranges noted although some antialdosterone activity might be exhibited by such abnormal doses at sacrifice to the patient.

In veterinary practice, the compositions can be given per se or as an additive to the feed or drinking matter of the animals. These compositions are made following the conventional techniques of the pharmaceutical chemist involving mixing, graulating and compressing when necessary or variously mixing and dissolving the ingredients as appropriate to the desired end product. Exemplary of clinical conditions which may be treated with these compositions are hypertension in dogs, gut edema in swine and udder edema in cows.

In both animals and humans the compositions of this invention may contain additional medicinal ingredients such as vitamins and other diuretic agents such as, chlorothiazide, hydrochlorothiazide, chlorthalidone, pyrathiazine hydrochlor and acetazolamide. The thiazide type of conjunctive agent is preferred as described hereafter.

The compositions and methods of this invention as described above are advantageously carried out in conjunction with another non-pteridine diuretic particularly with a thiazide diuretic. Such thiazide diuretics may be represented by the following formula:

(Formula II)

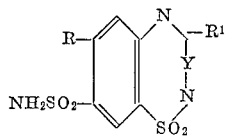

in which R is a fluoro, chloro or trifluoromethyl and the like, Y is a single or double bond (together with the carbon and nitrogen to which it is attached such as

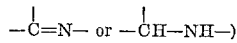

and $R^1$ is hydrogen, dichloromethyl, benzylmercaptomethyl or benzyl and the like. Exemplary of such thiazide derivatives are chlorothiazide, hydrochlorothiazide, flumethiazide, hydroflumethiazide, benzydroflumethiazide, trichloromethiazide or benzthiazide ("Urese").

The amount of the pteridine constituent of such a composition would be in the ranges noted above for the pteridine compositions described combined with a thiazide component of the structure described in dosage units of about 1 mg. to about 500 mg. preferably about 2 mg. to about 250 mg. depending on the potency of the thiazide component. These compositions when administered orally one to 4 times a day, have been found to give an enhanced diuretic activity over the individual doses of the pteridine or thiazide components. Alternatively the dosage units can be combined in sustained release form as desired to be administered orally once or twice daily. The combinations have also been found effective against hypotension.

*Example 1*

Ingredients: Amounts, mg.
2,4,7-triamino-6-m-methoxy-phenylpteridine __ 250
Magnesium stearate_____ 5
Lactose _____ 300

Screen above ingredients through a #40 mesh screen. Transfer to mixer and mix well. Fill into a #0 hard gelatin capsule.

One capsule is administered three times a day.

*Example 2*

Ingredients: Amounts, mg.
2,4,7-triamino-6-phenylpteridine _____ 100
Acetazolamide _____ 200
Magnesium stearate _____ 5
Lactose _____ 200

Screen above ingredients through a #40 mesh screen and mix well. Fill into a #0 hard gelatin capsule.

One capsule is administered twice a day.

*Example 3*

Ingredients: Amounts, mg.
2,4,7-triamino-6-o-methylphenylpteridine ____ 100
Chlorothiazide _____ 250
Magnesium stearate _____ 10
Lactose _____ 200

Mix above ingredients well and fill into a #0 hard gelatin capsule.

*Example 4*

Ingredients: Amounts, mg.
2,47-triamino-6-o-methylphenylpteridine _____ 100
Peanut oil _____ 225

The ingredients are mixed to a thick slurry and filled into a soft gelatin capsule.

*Example 5*

Ingredients: Amounts, mg.
2,4,7-triamino-6-phenylpteridine _____ 5
Calcium sulfate, dihydrate _____ 125
Sucrose _____ 25
Starch _____ 15
Talc _____ 5
Stearic acid _____ 3

The sucrose, calcium sulfate and 2,4,7-triamino-6-phenylpteridine are thoroughly mixed and granulated with hot 10% gelatin solution. The wetted mass is passed through a #6 mesh screen directly onto drying trays. The granules are dried at 120° F. and passed through a #20 mesh screen. These granules are then mixed with the starch, talc and stearic acid, passed through a #60 mesh screen and then compressed into tablets.

Example 6

Ingredients: Amounts, mg.
- 2,4,7-triamino-6-phenylpteridine _____ 10
- Magnesium stearate _____ 5
- Lactose _____ 340

Screen the ingredients, mix and fill into a #1 hard gelatin capsule. Three capsules are administered orally to an edematous patient daily.

Example 7

Ingredients: Amounts, mg.
- 2,4,7-triamino-6-phenyl pteridine _____ 25
- Trichloromethiazide _____ 2
- Magnesium stearate _____ 5
- Lactose _____ 320

The ingredients are screened and filled into a #1 capsule. Four capsules are administered daily.

Example 8

Ingredients: Amounts, mg.
- 2,4,7-triamino-6-phenylpteridine _____ 100
- Hydroflumethiazide _____ 100
- Lactose _____ 150

The ingredients are mixed and filled into a hard gelatin capsule then administered orally twice a day.

Example 9

Ingredients: Amounts, mg.
- 2,4,7-triamino-6-phenylpteridine _____ 75
- Flumethiazide _____ 400
- Lactose _____ 75

The ingredients are mixed and filled into a hard gelatin capsule then administered orally twice a day.

Example 10

Ingredients: Amounts, mg.
- 2,4,7-triamino-6-phenylpteridine _____ 25
- Benzydroflumethiazide _____ 5
- Magnesium stearate _____ 5
- Lactose _____ 300

The ingredients are mixed and filled into a hard gelatin capsule then administered orally three times a day.

Example 11

Ingredients: Amounts, mg.
- 2,4,7 - triamino-6-p-trifluoromethylphenylpteridine _____ 100
- Lactose _____ 200

The ingredients are mixed and filled into a hard gelatin capsule then administered orally to hypertensive or edematous patients once a day.

Example 12

Ingredients: Amounts, mg.
- 7 - dimethylamino-2,4-bismethylamino-6-phenylpteridine _____ 75
- Lactose _____ 200

The ingredients are mixed and filled into capsules.

Example 13

Ingredients: Amounts, mg.
- 4,7 - diamino - 2 - dimethylamino-6-phenylpteridine _____ 150
- Talc _____ 150
- Magnesium stearate _____ 5

The ingredients are mixed, screened and tabletted.

Example 14

Ingredients: Amounts, mg.
- 2,4,7-triamino-6-phenylpteridine _____ 10
- Hydrochlorothiazide _____ 50
- Talc _____ 150

The ingredients are mixed, screened and filled into capsules, then administered orally to edematous patients q.i.d.

Example 15

Ingredients: Amounts, mg.
- 2,4,7-triamino-6-p-fluorophenylpteridine _____ 125
- Lactose _____ 125

The ingredients are mixed and filled into capsules.

Example 16

Ingredients: Amounts, mg.
- 2,4,7-triamino-6-p-ethoxyphenylpteridine _____ 200
- Lactose _____ 100
- Magnesium stearate _____ 5

The ingredients are mixed and filled into capsules.

Example 17

Ingredients: Amounts, mg.
- 2,4,7 - triamino - 6 - α - thienylpteridine (M.P. 356° C.) _____ 150
- Lactose _____ 150

The ingredients are mixed, screened and filled into capsules.

Example 18

To a solution of 9 g. of 5-nitroso-2,4,6-triaminopyrimidine in 500 ml. of refluxing dimethylformamide is added 9 g. of phenylacetonitrile and the refluxing is stopped. The 3 g. of anhydrous sodium methoxide is added and the mixture is refluxed for 15 minutes. The mixture is chilled and the solid is filtered and washed several times with warm water until the washings are neutral. Drying gives yellow crystals which are recrystallized with a Darco treatment from formamide-water heating the solution no hotter than 125° C. This product is then suspended in filtered deionized water and warmed for 15 minutes. This yields the 2,4,7-triamino-6-phenylpteridine as yellow crystals with a melting point of from 314°–317° C.

Example 19

0.45 g. of sodium is dissolved in 180 ml. of hot dry 2-ethoxyethanol and 2.25 g. of 2,4,6-triamino-5-nitrosopyrimidine is added followed by 2.1 g. of o-methylphenylacetonitrile. After two hours of refluxing the solution is evaporated to dryness in vacuo. The residue is dissolved in hot 10% hydrochloric acid and the solution is treated with charcoal and filtered. The filtrate is neutralized with 10% aqueous ammonia and cooled. The base is collected and recrystallized from n-butanol giving 2,4,7-triamino-6-o-methylphenylpteridine.

Example 20

To a solution of 4.5 g. of 2,4,6-triamino-5-nitrosopyrimidine in 250 ml. of refluxing dimethylformamide is added 5.0 g. of m-methoxyphenylacetonitrile and the refluxing is stopped and 1.5 g. of anhydrous sodium methoxide is added and the mixture is refluxed for one hour. After chilling the solid is filtered and washed with warm water until the washings are neutral. The solid is dried and the crystals are recrystallized with a Darco treatment from formamide water heating the solution no hotter than 125° C. The crystals are then suspended in filtered deionized water and warmed for 20 minutes. This yields 2,4,7-triamino-6-m-methoxyphenylpteridine, M.P. 334° C.

Example 21

To a solution of 7.0 g. of 5-nitroso-2,4,6-triaminopyrimidine in 375 ml. of refluxing dimethylformamide is added 7.6 g. of p-chlorophenylacetonitrile and the refluxing is stopped and 2.4 g. of anhydrous sodium methoxide is added and the mixture refluxed for 45 minutes. The mixture is chilled and the solid filtered and washed several times with warm water until the washings are neutral. The solid is dried giving yellow crystals which are recrystallized with a Darco treatment from n-butanol. The crystals are then suspended in filtered deionized water and warmed for 25 minutes yielding 2,4,7-triamino-6-p-chlorophenylpteridine, M.P. 378–380° C.

Example 22

A mixture of 4.5 g. of 5-nitroso-2,4,6-triamino-pyrimidine and 5 g. of p-trifluoromethylphenylacetonitrile in 300 ml. of dimethylformamide is heated at reflux briefly, then 1.5 g. of sodium ethoxide is added. After working up as in Example 18 2,4,7-triamino-6-p-trifluoromethylphenylpteridine is obtained.

p-Trifluoromethylphenylacetonitrile is prepared by (1) reducing the known aldehyde with lithium aluminum hydride in ether to the alcohol, B.P. 65–67° C. at 0.4 mm., (2) refluxing the alcohol with 48% hydrogen bromide solution for 3 hours to give the bromide, and (3) reacting the bromide with sodium cyanide at reflux for two hours in aqueous ethanol to give p-trifluoromethylphenylacetonitrile, M.P. 42–43° C.

Example 23

A mixture of 4 g. of 4,6-diamino-2-dimethylamino-5-nitroso pyrimidine, 4 g. of phenylacetonitrile, 1.5 g. of potassium methoxide and 250 ml. of dimethylacetamide are reacted and worked up as in Example 18 to give 4,7-diamino-2-dimethylamino-6-phenylpteridine.

Example 24

A mixture of 6.2 g. of 6-phenyl-2,4,7-trichloropteridine and 100 ml. of dipropylamine is heated at reflux for 2 hours. The warm mixture is poured into water to give the solid 6-phenyl-2,4,7-tridipropylaminopteridine.

6-phenyl-2,4,7-trichloropteridine, M.P. 157° C., is obtained from reacting 6-phenyl-2,4,7-trihydroxypteridine with a mixture of phosphorus pentachloride and phosphorus oxychloride at reflux temperature.

A mixture of 11 g. of 2,4-dihydroxy-5,6-diamino-pyrimidine, 19.5 g. of ethyl phenylglyoxylate acid and 100 ml. of acetic acid is heated one hour on the steam bath. Water (100 ml.) is added and the heating period continued for 3 hours. The reaction mixture is evaporated to give crude 6-phenyl-2,4,7-trihydroxypteridine.

Example 25

A mixture of 3.1 g. of 6-phenyl-2,4,7-trichloropteridine, 5 ml. of dimethylamine in dioxane is cooled and allowed to stand for several hours. The residue after evaporating the volatiles in vacuo is then reacted in a sealed tube with 20 ml. of 25% methylamine in absolute ethanol at 100° C. for 1 hour. The reaction residue is quenched in water to give the desired 7-dimethylamino-2,4-bismethylamine-6-phenylpteridine. Substituting ammonia for the methylamine gives 7-dimethylamino-2,4-diamino-6-phenylpteridine.

Example 26

Substituting molar equivalent quantities of p-fluorophenylacetonitrile for the p-chlorophenylacetonitrile starting material in Example 21 gives 2,4,7-triamino-6-p-fluorophenylpteridine, M.P. 362° C. Substituting p-ethoxyphenylacetonitrile for m-methoxyphenylacetonitrile in Example 21 gives the p-ethoxy analogue, M.P. 349° C. Substituting α-thienylacetonitrile for phenylacetonitrile in Example 18 gives the α-thienyl analogue.

The present application is a continuation-in-part application copending with application Serial No. 810,551, filed May 4, 1959, entitled "Diuretic Compositions and Method of Producing Diuresis," now abandoned.

What is claimed is:

1. A non-toxic pharmaceutical composition having antialdosterone activity, in dosage unit form adapted for internal administration, comprising a pharmaceutical carrier and from about 5 mg. to about 250 mg. of a pteridine compound having the formula:

in which R is a member selected from the group consisting of lower alkyl having not in excess of 3 carbon atoms and hydrogen; and R¹ is a member selected from the group consisting of hydrogen, lower alkyl having not in excess of 3 carbon atoms, trifluoromethyl, halo and lower alkoxy having not in excess of 3 carbon atoms.

2. A pharmaceutical composition in accordance with claim 1 characterized in that the pteridine compound is present in an amount of from about 10 mg. to about 100 mg.

3. A pharmaceutical composition having diuretic and hypotensive activity, in dosage unit form adapted for internal administration, comprising a pharmaceutical carrier and from about 5 mg. to about 250 mg. of 2,4,7-triamino-6-phenylpteridine.

4. A pharmaceutical composition in accordance with claim 3 characterized in that 2,4,7-triamino-6-phenylpteridine is present in an amount of from about 10 mg. to about 100 mg.

5. The method of producing diuretic and hypotensive activity which comprises internally administering to an animal organism in an amount sufficient to produce said activities a pteridine compound having the formula:

in which R is a member selected from the group consisting of lower alkyl having not in excess of 3 carbon atoms and hydrogen; and R¹ is a member selected from the group consisting of hydrogen, lower alkyl having not in excess of 3 carbon atoms, trifluoromethyl, halo and lower alkoxy having not in excess of 3 carbon atoms.

6. The method of claim 5 in which the administration is orally.

7. The method of claim 6 in which the pteridine compound is administered in a daily dosage regimen of from about 5 mg. to about 1000 mg.

8. The method of claim 6 in which the pteridine compound is administered in a daily dosage regimen of from about 10 mg. to about 400 mg.

9. The method of producing diuretic and hypotensive activity which comprises internally administering to an animal organism in an amount sufficient to produce said activities 2,4,7-triamino-6-phenylpteridine.

10. The method of claim 9 in which the administration is orally to edematous human beings.

11. The method of claim 10 in which the 2,4,7-triamino-6-phenylpteridine is administered in a daily dosage regimen of from about 5 mg. to about 1000 mg.

12. The method of claim 10 in which the 2,4,7-triamino-6-phenylpteridine is administered in a daily dosage regimen of from about 5 mg. to about 600 mg.

13. The method of claim 10 in which the 2,4,7-triamino-6-phenylpteridine is administered in a daily dosage regimen of from about 10 mg. to about 400 mg.

14. A pharmaceutical composition having diuretic and hypotensive activity comprising from about 5 mg. to about 250 mg. of a pteridine compound having the formula:

in which R is a member selected from the group consisting of lower alkyl having not in excess of 3 carbon atoms and hydrogen; and R¹ is a member selected from the group consisting of hydrogen, lower alkyl having not in excess of 3 carbon atoms, trifluoromethyl, halo and lower alkoxy having not in excess of 3 carbon atoms, and from about 1 mg. to about 500 mg. of a thiazide compound having the formula:

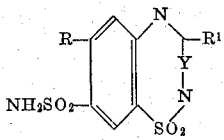

in which R is a member selected from the group consisting of fluoro, chloro and trifluoromethyl, Y is a member selected from the group consisting of a single bond and a double bond, and $R^1$ is a member selected from the group consisting of hydrogen, dichloromethyl, benzylmercaptomethyl and benzyl.

15. A pharmaceutical composition in accordance with claim 14 characterized in that the pteridine compound is 2,4,7-triamino-6-phenylpteridine.

16. A pharmaceutical composition having diuretic and hypotensive activity comprising from about 10 to about 100 mg. of 2,4,7-triamino-6-phenylpteridine and from about 2 mg. to about 250 mg. of a thiazide member selected from the group consisting of chlorothiazide, hydrochlorothiazide, flumethiazide, hydroflumethiazide, benzydroflumethiazide trichloromethiazide and benzthiazide.

17. A pharmaceutical composition in accordance with claim 16 characterized in that the thiazide member is hydrochlorothiazide.

18. A pharmaceutical composition in accordance with claim 16 characterized in that the thiazide member is hydroflumethiazide.

19. A pharmaceutical composition having diuretic and hypotensive activity, in dosage unit form adapted for internal administration comprising a pharmaceutical carrier and from about 5 mg. to about 250 mg. of 7-dimethylamino-2,4-diamino-6-phenylpteridine.

20. The method of producing diuretic and hypotensive activity in edematous mammals which comprises orally administering to said mammals from 1–4 times daily a composition comprising from about 5 mg. to about 250 mg. of 2,4,7-triamino-6-phenylpteridine and from about 1 mg. to about 500 mg. of a thiazide member selected from the group consisting of chlorothiazide, hydrochlorothiazide, flumethiazide, hydroflumethiazide, benzydroflumethiazide, trichloromethiazide and benzthiazide.

21. A pharmaceutical composition having diuretic and hypotensive activity, in dosage unit form adapted for internal administration comprising a pharmaceutical carrier and from about 5 mg. to about 250 mg. of 2,4,7-triamino-6-α-thienylpteridine.

22. The method of producing diuretic and hypotensive activity which comprises internally administering to an animal organism in an amount sufficient to produce said activity 2,4,7-triamino-6-α-thienylpteridine.

References Cited in the file of this patent
UNITED STATES PATENTS

| | | |
|---|---|---|
| 2,963,478 | Weinstock | Dec. 6, 1960 |
| 2,963,479 | Taylor | Dec. 6, 1960 |
| 2,963,480 | Taylor et al. | Dec. 6, 1960 |
| 2,963,481 | Grannel et al. | Dec. 6, 1960 |
| 2,975,180 | Osdene et al. | Mar. 14, 1961 |
| 2,998,420 | Weinstock | Aug. 29, 1961 |

OTHER REFERENCES

Sprickett et al.: J. Chem. Soc. (London), 1954, pp. 2887–2895 through 49, Chemical Abstracts, 10967h (1955).

Clinical Medicine, 4: 7, p. 930, July 1957.

Kagawa et al.: Science, 126 (3281), Nov. 15, 1957, pp. 1015–1016.

Drug Trade News, 32 (23), pp. 47 and 68, Nov. 18, 1957.

New Eng. J. Med., 260; 1, pp. 28–30, Jan. 1, 1959.

C. and E. News, 37 (16), pp. 40–41, Apr. 20, 1959.

Freis: J.A.M.A., Jan. 10, 1959, 169(2), pp. 105–109.